(12) United States Patent
Quaedackers et al.

(10) Patent No.: US 10,563,974 B2
(45) Date of Patent: Feb. 18, 2020

(54) METHOD FOR MEASURING A HEIGHT MAP OF MULTIPLE FIELDS OF VIEW AND COMBINING THEM TO A COMPOSITE HEIGHT MAP WITH MINIMIZED SENSITIVITY TO INSTRUMENT DRIFT

(71) Applicant: MITUTOYO CORPORATION, Kanagawa (JP)

(72) Inventors: Johannes Anna Quaedackers, Veldhoven (NL); Adriaan Tiemen Zuiderweg, Breda (NL)

(73) Assignee: MITUTOYO CORPORATION, Kanagawa (JP)

( * ) Notice: Subject to any disclaimer, the term of this patent is extended or adjusted under 35 U.S.C. 154(b) by 251 days.

(21) Appl. No.: 15/198,261

(22) Filed: Jun. 30, 2016

(65) Prior Publication Data

US 2017/0052018 A1   Feb. 23, 2017

(30) Foreign Application Priority Data

Aug. 19, 2015  (EP) ..................... 15181597

(51) Int. Cl.
   *G01B 11/06*   (2006.01)
(52) U.S. Cl.
   CPC ............................... *G01B 11/0608* (2013.01)
(58) Field of Classification Search
   CPC ................ G01B 11/0608; G01B 11/24; G01B 2290/65; G01B 9/0209
   See application file for complete search history.

(56) References Cited

U.S. PATENT DOCUMENTS

| | | | |
|---|---|---|---|
| 5,987,189 A | 11/1999 | Shumucker et al. | |
| 2003/0069566 A1* | 4/2003 | Williams | A61F 9/00804 606/5 |
| 2007/0003163 A1* | 1/2007 | Lee | G01B 11/2441 382/284 |
| 2007/0013894 A1* | 1/2007 | Loopstra | G03B 27/58 355/72 |
| 2009/0021576 A1 | 1/2009 | Linder et al. | |
| 2009/0296101 A1 | 12/2009 | Oshima et al. | |
| 2012/0002213 A1* | 1/2012 | Kannaka | G01B 11/0608 356/492 |
| 2013/0162803 A1 | 6/2013 | Steckhan et al. | |

OTHER PUBLICATIONS

Kovács, "Scanning strategies for imaging arrays", Proc. SPIE Proc.SPIE Int.Soc.Opt.Eng.7020:5,2008.*

(Continued)

*Primary Examiner* — Mohamed Charioui
*Assistant Examiner* — Catherine T. Rastovski
(74) *Attorney, Agent, or Firm* — Greenblum & Bernstein, P.L.C.

(57) ABSTRACT

A method for measuring a height map of multiple fields of view on a surface of a substrate with an optical profilometer and combining them to a composite height map, the method includes: moving the profilometer relative to the surface from field to field along a route; measuring height maps of fields on the surface along the route with the profilometer; and, combining a plurality of height maps of measured fields by normalizing said height maps to each other to produce a composite height map of the surface; wherein the route is configured to minimize sensitivity to height drifting of the profilometer during combining a plurality of the height maps.

12 Claims, 22 Drawing Sheets

(56) References Cited

OTHER PUBLICATIONS

Search Report issued by European Patent Office (EPO) for Patent Application No. 15181597.4, dated Feb. 12, 2016.
Chinese Office Action dated Jun. 27, 2019 issued for Chinese patent application No. 201610685793.4 along with an English translation thereof.

* cited by examiner

METHOD FOR MEASURING A HEIGHT MAP OF MULTIPLE FIELDS OF VIEW AND COMBINING THEM TO A COMPOSITE HEIGHT MAP WITH MINIMIZED SENSITIVITY TO INSTRUMENT DRIFT

FIELD

The invention relates to a method for measuring a height map of multiple fields of view on a surface of a substrate with an optical profilometer and combining them to a composite height map, the method comprises:
moving the profilometer relative to the surface from field to field along a route;
measuring height maps of fields on the surface along the route with the profilometer; and,
combining a plurality of height maps of measured fields to produce a composite height map of the surface.

BACKGROUND

U.S. Pat. No. 5,987,189A discloses a method of combining height profiles of adjacent sections of a test surface to produce a composite profile of the surface and consists of taking successive measurements of adjacent sections of the surface of the test sample by sequentially placing them within the field of view of the instrument and profiling them by phase shifting or vertical scanning. The x-y translation of the microscope between successive measurements from one section to the next adjacent section of the surface being profiled is carried out by overlapping such sections, so that spatial continuity is maintained between measurements. The height data generated for each section are then combined to form a larger image corresponding to the entire surface tested and discontinuities and/or errors introduced by the x-y translation process are corrected by normalizing the overlapping portions to a common reference plane.

A plane is fitted through each set of measured heights in the overlapping regions and the tip, tilt and offset of each fitted plane are corrected to produce matching overlapping height data in adjacent sections. The measured height data for the balance of each section are then also corrected by the same difference in tip, tilt and offset to obtain a continuous normalized image.

An optical measuring system will have height drift because of heating and expansion of the optical components and/or sample, from the moment of switch on of the illumination or by variation in the environment temperature.

As time passes, the height drift may stabilize as the system and/or sample approaches thermal equilibrium. To avoid height drift effects, normal operation of an optical system (but not in the sample unless the sample is warmed up as well over all locations to be measured); however this takes a large amount of time.

Drift may have other causes as well, such as:
Ambient or instrument vibration
Instability in the ambient measurement environment (e.g. variations in ambient air temperature, air pressure, or in other applicable factors)
System creep
In such a situation height stability will never be achieved completely and always some drift will remain which cannot be pre-empted by instrument warm-up.

When fields are combined to measure a height map of a work piece larger than one field of view (FOV), drift will result in height offsets between the individual fields of view. An example may be found in a simulated measurement of an optical flat. The measurement is started from the lower left field of view and proceeds sequentially (See the measurement sequence in FIG. 1). The simulated individual FOV measurements are shown in FIG. 2.

Depending on the degrees of freedom in the combining algorithm, original global tilt and global orientation of the surface might be lost. Subsequently, the reconstruction of the global tilt and global orientation may be done by fitting a plane, for instance in a least-squares sense, to the individual measured fields. Depending on the measurement order (routing) the height offsets induced by the drift will then result in a global tilt error of the final result. An example of such a tilt error is shown in FIG. 3, which are the simulated results of stitching or combining the dataset of FIG. 2.

SUMMARY

It is therefore an objective of the invention to provide a method for measuring a height map of multiple fields of view on a surface of a substrate with an optical profilometer and combining them to a composite height map with minimized sensitivity to height drifting of the profilometer which otherwise will give rise to tilt errors in the composite height map.

Accordingly there is provided a method for measuring a height map of multiple fields of view on a surface of a substrate with an optical profilometer and combining them to a composite height map, the method comprises:
moving the profilometer relative to the surface from field to field along a route;
measuring height maps of fields on the surface along the route with the profilometer; and, combining a plurality of height maps of measured fields to produce a composite height map of the surface, wherein the route is configured to minimize sensitivity to the effects caused by height drift of the profilometer during combining the plurality of height maps.

By configuring the route the sensitivity of the combining multiple fields of view to a composite height map to height drift of the profilometer may be minimized which otherwise would give rise to tilt errors in the composite height map.

According to a further embodiment the route comprises directions with a first and second directional component, the second directional component being substantially perpendicular to the first directional component, and sequentially moving of the profilometer relative to the surface in a) comprises at least one time moving forward and backward in both the first and second directional component during measuring height maps of fields.

By at least one time moving forward and backward in both the first and second directional component during measuring height maps of fields, the fields may be better divided over the surface to minimize the sensitivity to height drifting of the profilometer.

The route may also be defined in a third direction, corresponding to the height, perpendicular to the first and second direction.

According to a further objective moving forward and backward in both the first and second directional component comprises moving forward and backward in the first direction at least two fields of view and moving forward and backward in the second direction (e.g. left or right) at least two fields of view.

By at least moving forward and backward in both the first and second directional component at least two fields of view during measuring height maps of fields of view, the fields of view may be better divided over the surface to minimize the sensitivity to height drifting of the profilometer.

According to a further embodiment moving of the profilometer relative to the surface comprises at least two time moving forward and backward in both the first and second directional component during measuring height maps of fields of view.

By at least two time moving forward and backward in both the first and second directional component the sensitivity to height drifting of the profilometer may be further minimized which otherwise will give rise to errors in the composite height map.

According to a further embodiment the route is configured to measure the fields of view in substantially random order.

By configuring the route to measure the fields of view in substantially random order the sensitivity to height drifting of the profilometer may be minimized.

According to a further embodiment the route has a spiral or spiral-like shape.

By configuring the route to measure the fields of view in a spiral or spiral-like shape the sensitivity to height drifting of the profilometer may be minimized during combining the plurality of height maps.

According to a further embodiment objective the method comprises measurement and/or re-measurement of edge fields of views positioned substantially near the edges of the surface in direct order to minimize the time and thereby the drift between these measurements. The global tilt reconstruction will be based on these fields only. By maximizing the distance between these fields while minimizing the time in between the measurements the global tilts error of the composite height map will be minimized.

According to a further embodiment the route comprises crossing a centre of the multiple fields of view on the surface multiple times.

By crossing the centre of the multiple fields of view on the surface multiple times the sensitivity to height drifting of the profilometer may be minimized.

According to a further embodiment the method comprises moving from a measured field to a subsequent to be measured field leaving one, two, three or even more fields in between.

By configuring the route to move from field to field leaving one, two, three or even more fields in between the fields the sensitivity to height drifting of the profilometer may be minimized.

According to a further embodiment during measuring height maps of fields on the surface with the profilometer a region of overlap or connection between neighbouring fields might be maintained and combining a plurality of height maps comprises using the region of overlap or connection (if maintained) to establish and correct for height differences between fields in order to produce the composite height map of the surface. If no overlap or connection is maintained, a common height reference might be used to establish and correct for height differences between fields to produce the composite height map of the surface. Hereby a composite height map may be obtained.

According to a further embodiment the method comprises using an algorithm to determine the route.

Hereby a route may be determined whereby the sensitivity to height drifting of the profilometer may be minimized.

Next a list of examples how to implement possible algorithms. This list is merely meant as examples and this invention does not exclude different variations, combination or different algorithms that serve the same purpose.

Algorithm 1

The order of measurement determined by this algorithm is dependent on the distance from the geometric centre of the configuration of field of views (FOVs) on the surface. The algorithm first selects the FOV with the largest distance from the centre of the surface, and places this one as first in the measurement order. In the case that several fields are at the same distance the first chosen will depend on the addressing order of the coding language, but in essence this does not matter. Once the first field is chosen, the algorithm searches again for the most distant field from the centre, excluding the field that is already chosen, and places this in the measurement order. The process is repeated until all fields are chosen. The order might also be reversed as this gives nearly the same results.

Algorithm 2

Similar to the previous algorithm, in this algorithm the FOV with the largest distance from the centre is located, and this is placed as first in the measurement order. However, the next field is determined by finding the maximum geometric distance from the location of the previous field, instead of the maximum field distance from the centre. This procedure is followed until all fields are allocated in the measurement sequence. The order might also be reversed as this gives nearly the same results.

Algorithm 3

Algorithm 3 is somewhat more complicated. Here the concept is to work in FOV pairs in order to make sure that the fields in those pairs are as opposite of the geographic centre of the surface as possible.

The first field, as in the algorithms above, is selected by looking for the maximum distance away from the centre. The next field is selected by looking for the closest field near the mirrored (about the centre) position of the first field. These two fields are added to the measurement sequence first.

The first field of the second (and subsequently, all following pairs) pair is selected by seeking an FOV, the position of which minimizes the distance to the previous chosen field, while maximizing the distance to the centre. The second field of the new pair is again selected by seeking a FOV closest to the mirrored (about the centre) position of the first. The procedure is followed until all pairs are designated in the measurement sequence, and any remaining field is added to the measuring order as needed. The order might also be reversed as this gives nearly the same results.

Algorithm 4

Algorithm 4 begins similarly to algorithm 3 in the method of selecting the first pair.

However, the first FOV of the following new pair (and successive pairs) is selected by searching for the nearest FOV to a virtual position at a location at the same distance from the centre as the first field of the previous pair, but rotated 90 degrees clockwise about the centre. The second FOV of the new pair is again selected by seeking a FOV closest to the mirrored (about the centre) position of the first.

The third pair (and all following pairs) are found by repeating the clockwise rotation, finding nearest FOV, and finding mirrored FOV procedure as above. Any remnant fields are added to the measurement sequence at the end. The order might also be reversed as this gives nearly the same results.

Algorithm 5

Algorithm 5 embodies a concept quite different than the algorithms above. Here, the case of a rectangular configuration FOV shape, the 4 corner fields i.e. fields positioned substantially near the edges are measured sequentially; after this, the first corner field is re-measured, completing a circuit around the extremities of the shape. The reestablishment of the global orientation and tilt is based on these 5 fields alone.

The designation of the corners is accomplished by simply finding the minima and maxima in X and Y of the multiple FOV centre coordinates and placing these FOVs on the measurement sequence list in the following order:
1. $(X_{min}, Y_{min})$
2. $(X_{max}, Y_{min})$
3. $(X_{max}, Y_{max})$
4. $(X_{min}, Y_{max})$
5. The first field is then repeated.

However, in the case of a non-rectangular configuration, it is possible that of the maxima and minima (X, Y) determined by searching in the first four steps above might cause the same FOV to be identified twice. An example is a T-shape configuration of FOVs: here the first and second fields identified in these steps would be the same FOV, and duly would be placed twice in the measurement sequence. To prevent this, a uniqueness check needs to take place between steps 4 and 5, which removes any duplicates while preserving the measurement order.

The order might also be reversed as this gives nearly the same results.

According to a further embodiment the optical profiler is a white-light interferometer (WLI), phase-shifting interferometer (PSI), chromatic point sensor (CPS), points-from-focus/shape-from-focus sensor (PFF/SFF), confocal microscope, structured illumination microscope (SIM), or laser interferometer microscope.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE DRAWINGS

Figure 4:
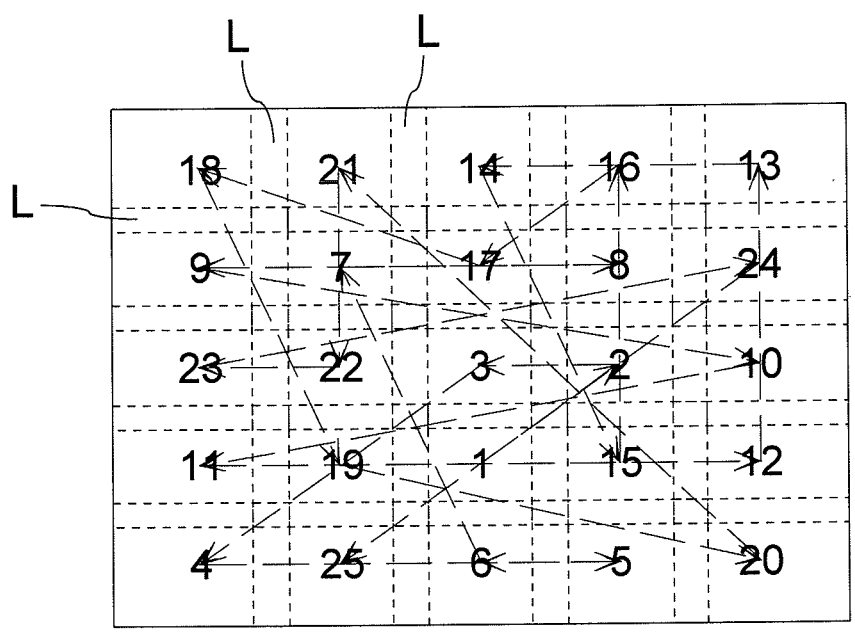
FIG. 4 depicts a measurement sequence according to an embodiment.

FIG. 4 depicts a measurement sequence according to an embodiment of the invention. The sequence starts with successively measuring height maps of individual fields of view on the surface with the profilometer by sequentially moving the profilometer relative to the surface from field 1 to field 2 and so on to field 25 and measuring the height map of each field 1 to 25 to generate a corresponding height map. The method therefore comprises successively measuring height maps of fields of view on the surface with the profilometer by:

a1) measuring a height map of a first field 1 on the surface with the profilometer;
a2) moving the profilometer relative to the surface from the first field to a subsequent field 2; and,
a3) repeating a1 to a2) until multiple fields of view on the surface of the substrate have been measured with the optical profilometer to generate the corresponding height maps. Hereby multiple fields of view on the surface of the substrate may be measured.

A plurality of height maps of measured fields of view generated may be combined by normalizing said height maps to each other to produce a composite height map of the surface. For this purpose a region of overlap L between neighbouring fields might be maintained and combining a plurality of height maps of measured fields of view comprises using the region of overlap to determine and correct for the height differences of the fields. Hereby a composite height map may be obtained.

By configuring the route the sensitivity to height drifting of the profilometer may be minimized.

The route comprises directions with a first and second directional component, the second directional component (for example from left to right in FIG. 4) being substantially perpendicular to the first directional component (for example from bottom to top in FIG. 4). Sequentially moving of the profilometer relative to the surface comprises at least one time moving forward and backward in both the first and second directional component during measuring height maps of fields of view. By at least one time moving forward and backward in both the first and second directional component during measuring height maps of fields of view, the fields of view may be better divided over the surface to minimize the sensitivity to height drifting of the profilometer. For example in FIG. 4 moving from 1 to 2 comprises moving forward in the first direction and in the second direction. Subsequently, the movement from 3 to 4 comprises moving backward in the first direction and in the second direction.

Moving forwards and backward in both the first and second directional component may comprise moving forward and backward in the first direction at least two fields and moving forward and backward (e.g. left or right) in the second direction at least two fields of view during the whole measurement sequence. For example in FIG. 4 moving from 6 to 7 comprises moving forward in the first direction at least two fields of view and moving from 7 to 8 comprises moving forward in the second direction at least two fields of view. The movement from 3 to 4 comprises moving backward in the first direction and in the second direction at least two fields of view.

The route in FIG. 4 may be configured to measure the fields of view in substantially random order. By configuring the route to measure the fields of view in substantially random order the sensitivity to height drifting of the profilometer may be minimized.

Figure 1:
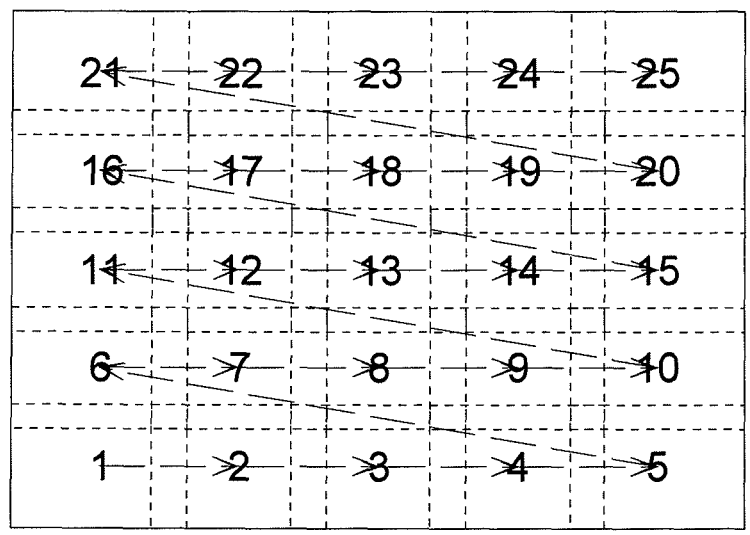
FIG. 1 depicts a measurement sequence.
Figure 2:
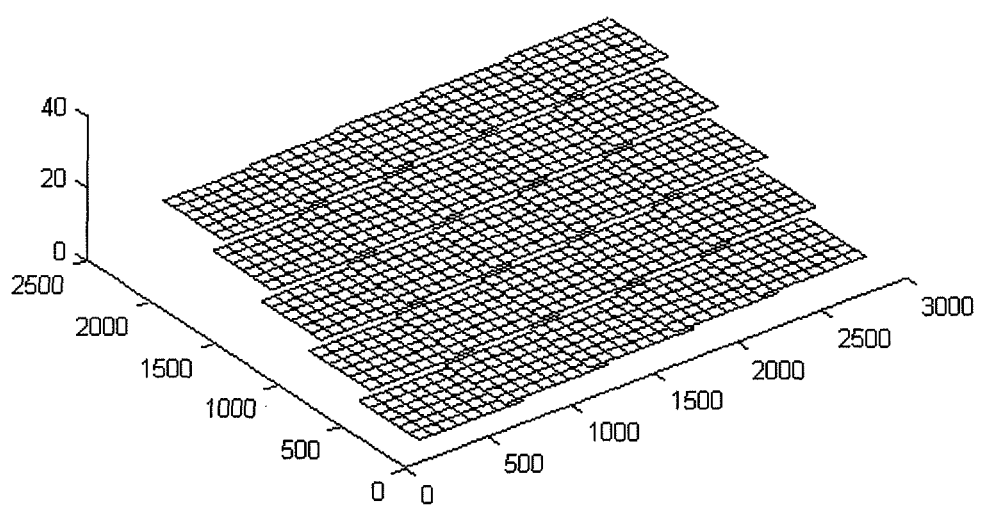
FIG. 2 depicts a simulated individual field of view measurement on a flat using the sequence of FIG. 1.
Figure 3:
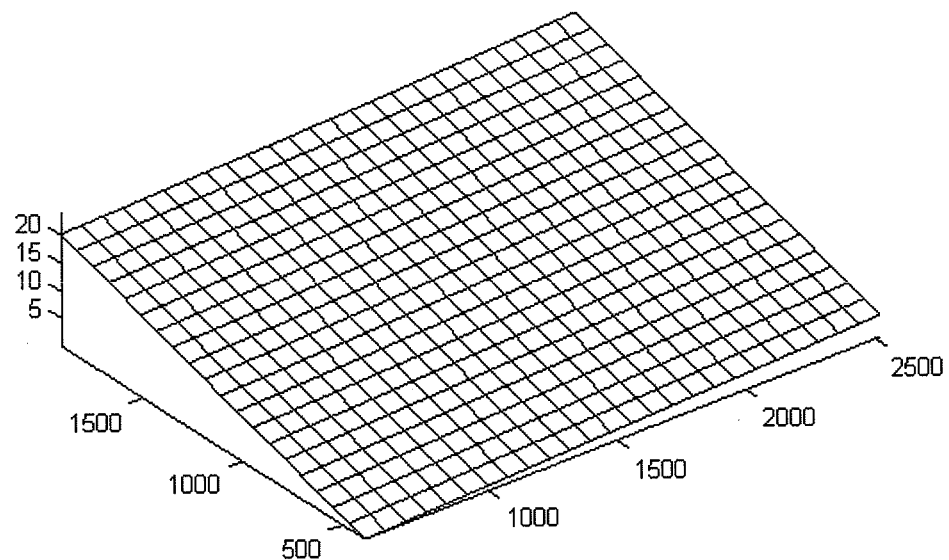
FIG. 3 depicts the simulated results of stitching the dataset of FIG. 2 and shows the remaining tilt error.
Figure 5:
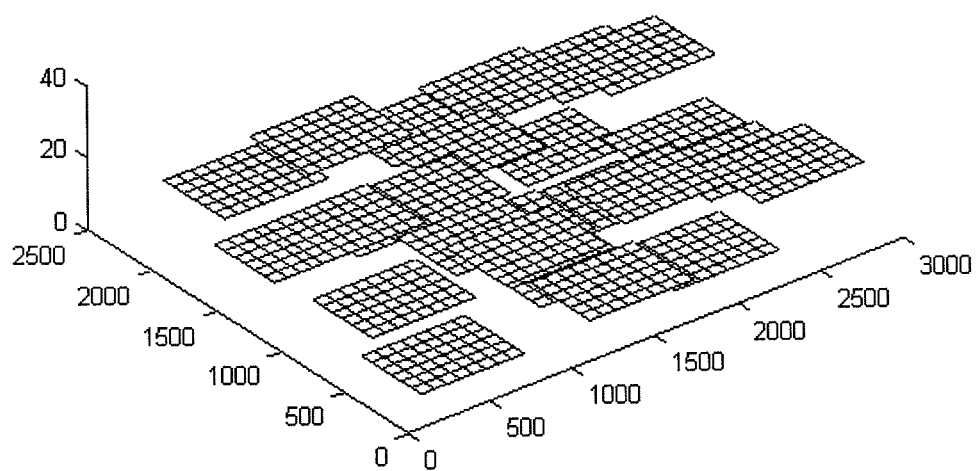
FIG. 5 depicts a simulated individual field of view measurement on a flat using the sequence of FIG. 4.
Figure 6:
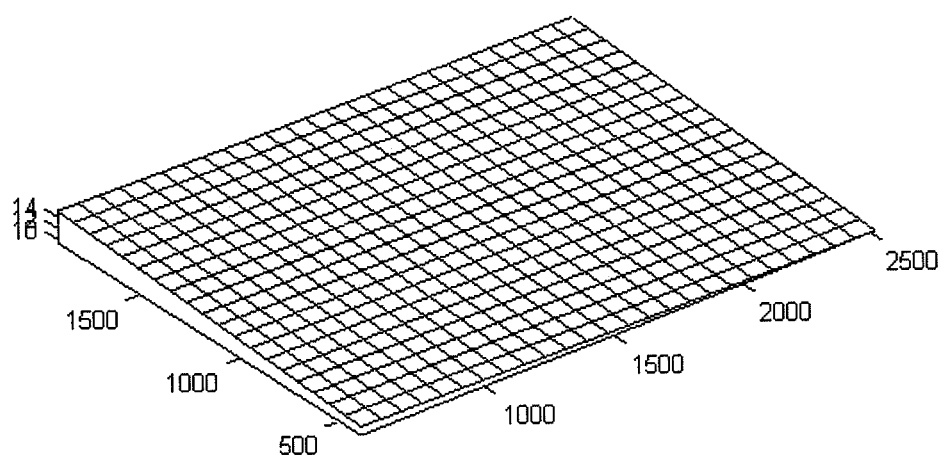
FIG. 6 depicts the simulated results of stitching the dataset of FIG. 5 and shows the remaining tilt error.

FIG. 5 depicts a simulated fields of view measurement on a flat using the sequence of FIG. 4. FIG. 6 depicts the simulated results after combining the dataset of FIG. 5 and shows the remaining tilt error. Comparing FIG. 6 with FIG. 3 shows that the remaining height error is substantially reduced in FIG. 6 by using the sequence of FIG. 4.

Figure 7:
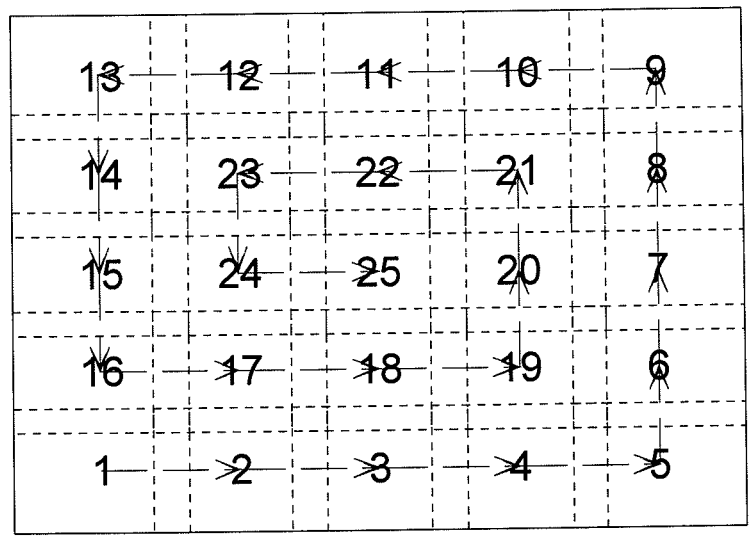
FIG. 7 depicts a measurement sequence according to a further embodiment.

The route in FIG. 7 comprises moving forward and backward in both the first and second directional component at least one fields of view during the whole measurement sequence. For example in FIG. 7 moving from 5 to 6 comprises moving forward in the first direction one field and moving from 1 to 2 comprises moving forward in the second direction one field. The movement from 9 to 10 comprises moving backward in the first direction and the movement from 13 to 14 comprises moving backward in the first direction one field.

The route has a spiral or spiral-like figure moving from 1 to 25 in FIG. 7. By configuring the route to measure the fields of view in a spiral or spiral-like figure the sensitivity to height drifting of the profilometer may be minimized.

Figure 8:
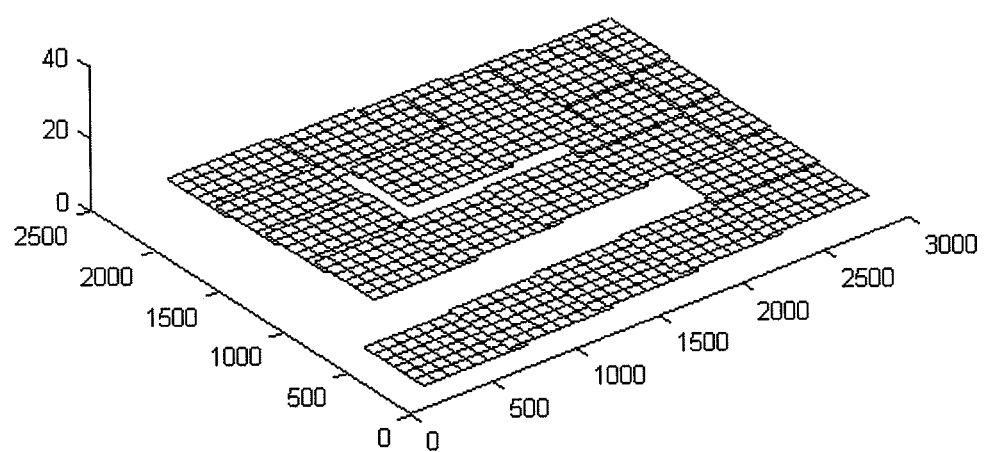
FIG. 8 depicts a simulated individual field of view measurement on a flat using the sequence of FIG. 7.
Figure 9:
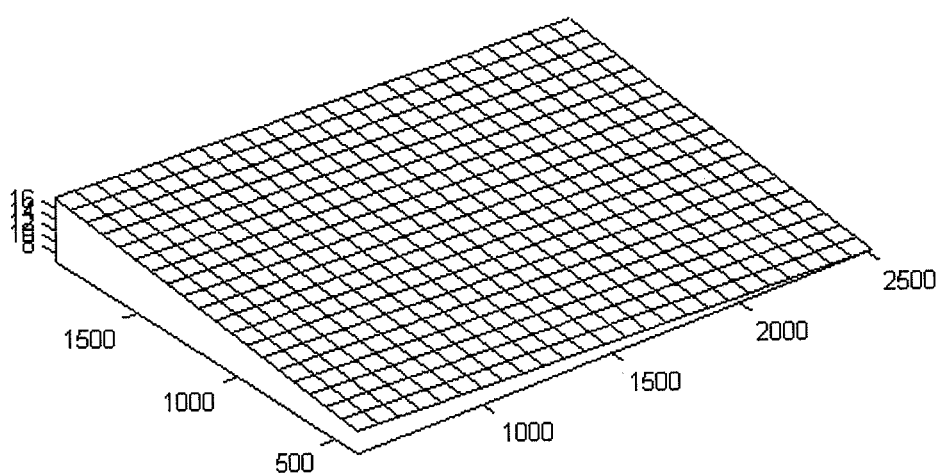
FIG. 9 depicts the simulated results of stitching the dataset of FIG. 8 and shows the remaining tilt error.

FIG. 8 depicts a simulated fields of view measurement on a flat using the sequence of FIG. 7. FIG. 9 depicts the simulated results after combining the dataset of FIG. 8 and shows the remaining tilt error. Comparing FIG. 9 with FIG. 3 shows that the remaining height error is substantially reduced in FIG. 9 by using the sequence of FIG. 8.

Figure 10:
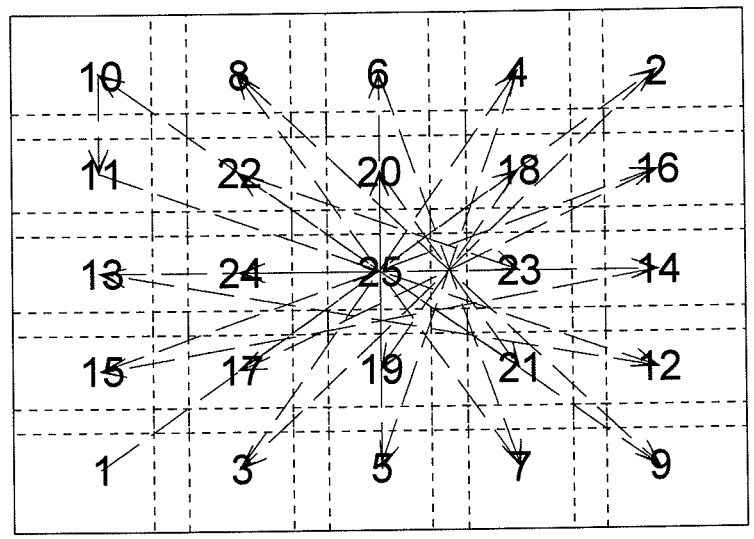
FIG. 10 depicts a measurement sequence according to yet a further embodiment.

FIG. 10 depicts a measurement sequence according to a further embodiment. The route comprises moving forward and backward in the first direction at least two fields of view and moving forward and backward (e.g. left or right) in the second direction at least two fields of view during the whole measurement sequence. It further comprises crossing a centre of the multiple fields of view 25 on the surface multiple times. By crossing the centre of the multiple fields of view on the surface multiple times the sensitivity to height drifting of the profilometer may be minimized. The route is configured to move from field to field leaving one, two, or even more fields of view in between. By configuring the route to move from field to field leaving one, two or even more fields of view in between the sensitivity to height drifting of the profilometer may be minimized.

Figure 11:
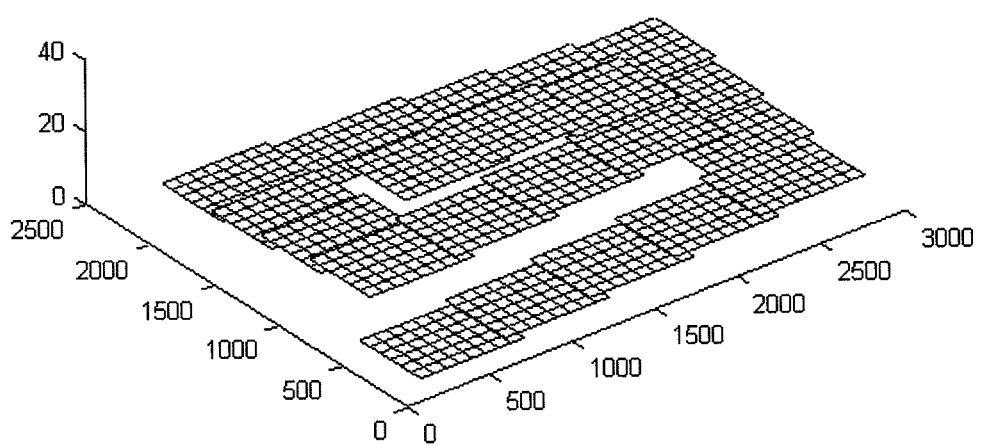
FIG. 11 depicts a simulated individual field of view measurement on a flat using the sequence of FIG. 10.
Figure 12:
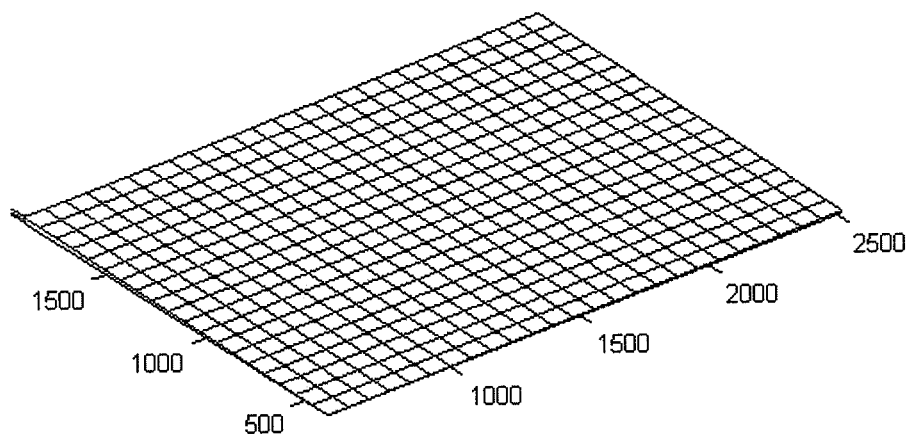
FIG. 12 depicts the simulated results of stitching the dataset of FIG. 11 and shows the remaining tilt error.

FIG. 11 depicts a simulated fields of view measurement on a flat using the sequence of FIG. 10. FIG. 12 depicts the simulated results after combining the dataset of FIG. 11 and shows the remaining tilt error. Comparing FIG. 12 with FIG. 3 shows that the remaining height error is substantially reduced in FIG. 12 by using the sequence of FIG. 10.

Figure 13:
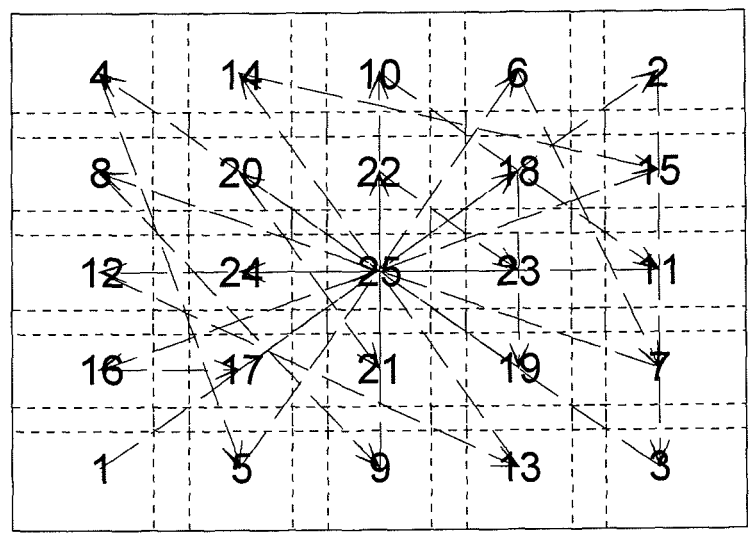
FIG. 13 depicts a measurement sequence according to a further embodiment.

FIG. 13 depicts a measurement sequence according to a further embodiment. The route comprising crossing the centre, moving forward and backward in the first and second direction at least one or two fields leaving one, two or even more fields of view in between the fields to minimize the sensitivity to height drifting.

Figure 14:
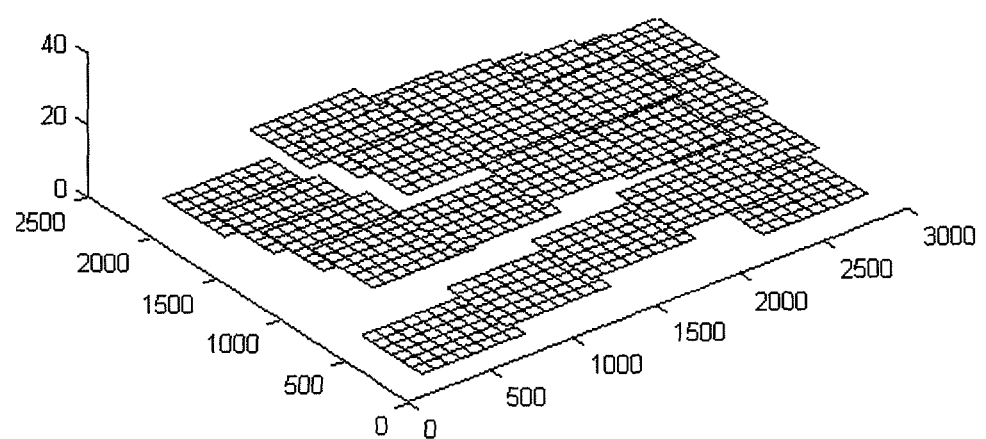
FIG. 14 depicts a simulated individual field of view measurement on a flat using the sequence of FIG. 13.
Figure 15:
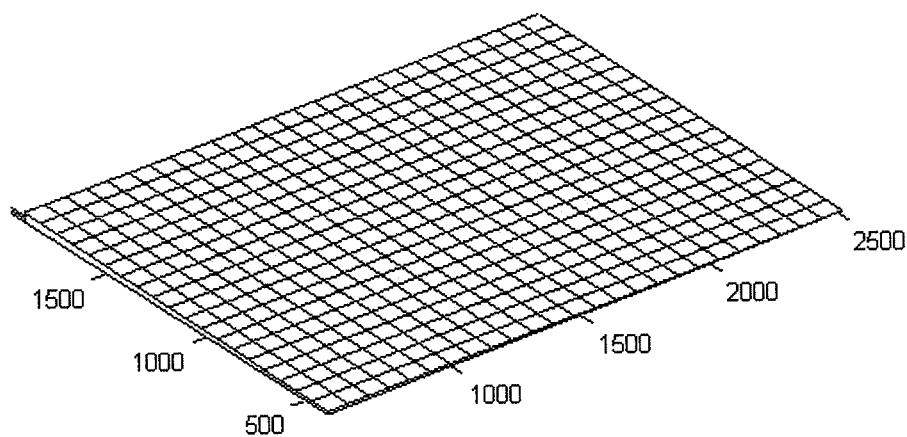
FIG. 15 depicts the simulated results of stitching the dataset of FIG. 14 and shows the remaining tilt error.

FIG. 14 depicts a simulated fields of view measurement on a flat using the sequence of FIG. 13. FIG. 15 depicts the simulated results after combining the dataset of FIG. 14 and shows the remaining tilt error. Comparing FIG. 15 with FIG. 3 shows that the remaining height error is substantially reduced in FIG. 15 by using the sequence of FIG. 13.

Figure 16:
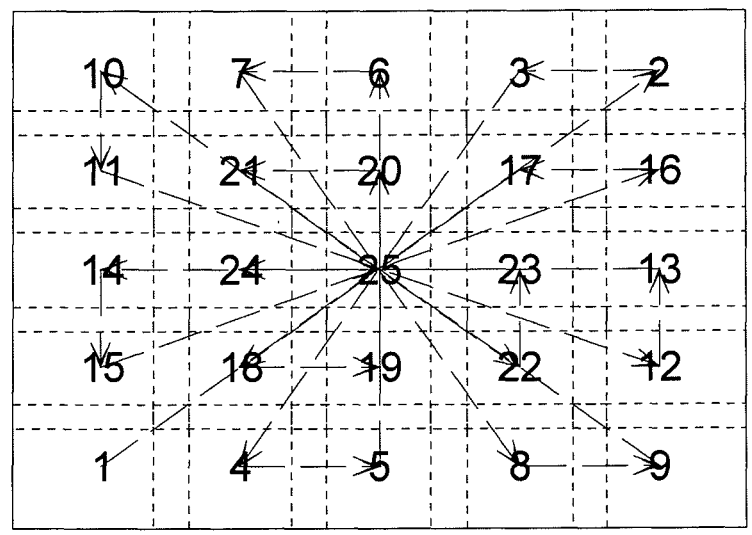
FIG. 16 depicts a measurement sequence according to a further embodiment.

FIG. 16 depicts a measurement sequence according to a further embodiment. The route comprising crossing the centre, moving forward and backward in the first and second direction at least one or two fields leaving one, two or even more fields of view in between the fields to minimize the sensitivity to height drifting.

Figure 17:
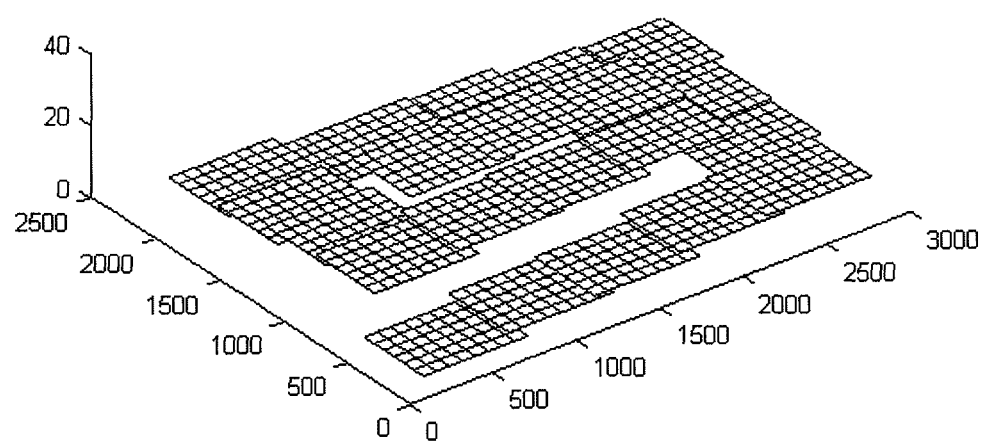
FIG. 17 depicts a simulated individual field of view measurement on a flat using the sequence of FIG. 16.
Figure 18:
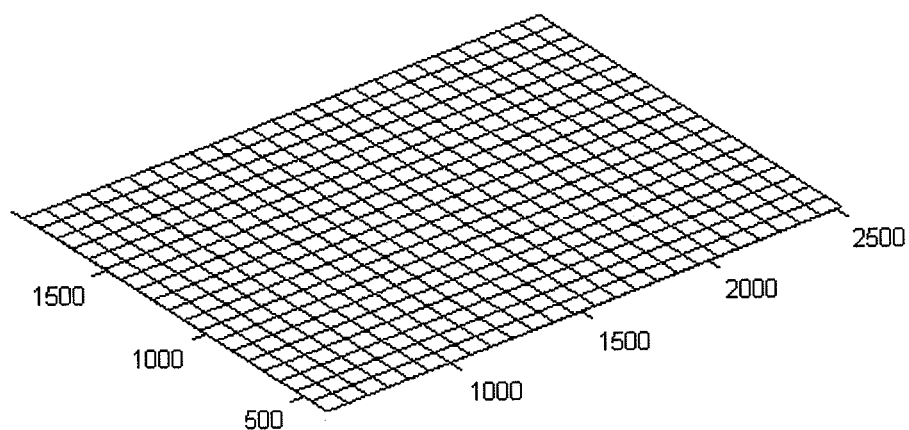
FIG. 18 depicts the simulated results of stitching the dataset of FIG. 17 and shows the remaining tilt error.

FIG. 17 depicts a simulated fields of view measurement on a flat using the sequence of FIG. 16. FIG. 18 depicts the simulated results after combining the dataset of FIG. 17 and shows the remaining tilt error. Comparing FIG. 18 with FIG. 3 shows that the remaining height error is substantially reduced in FIG. 18 by using the sequence of FIG. 16.

(Re-) measurement of certain fields of view positioned substantially near the edges of the surface in a direct time sequence at the extreme field positions (for example, the corner or on-axis fields), and basing global tilt and height retrieval on these fields of view alone may be considered. By maximizing the lateral distance while minimizing the time between measurements the tilt error is minimized.

Figure 19:
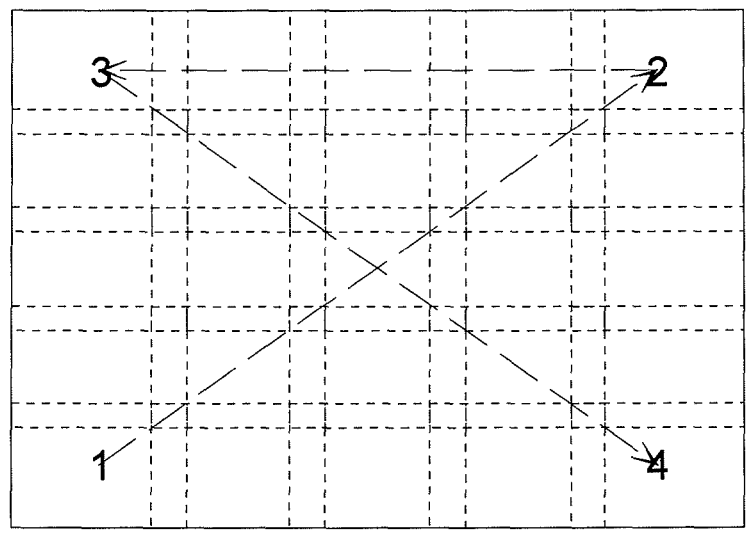
FIGS. 19 and 20 depict a measurement sequence according to a fourth embodiment of the invention.
Figure 20:
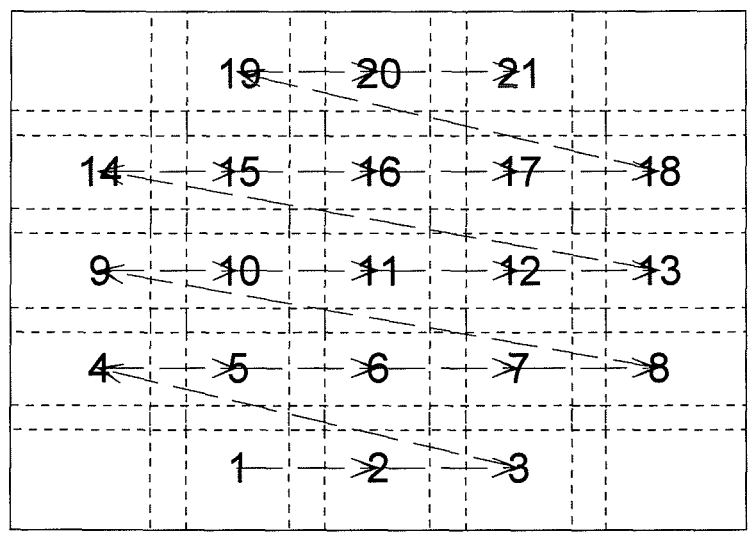

FIGS. 19 and 20 depict a measurement sequence according to such a further embodiment. The route of FIG. 19 comprises measurement of edge fields of view 1, 2, 3 or 4 positioned substantially near the edges of the surface. Subsequently, the remaining fields of view are measured in FIG. 20 with a time efficient route 1 to 21.

Figure 21:
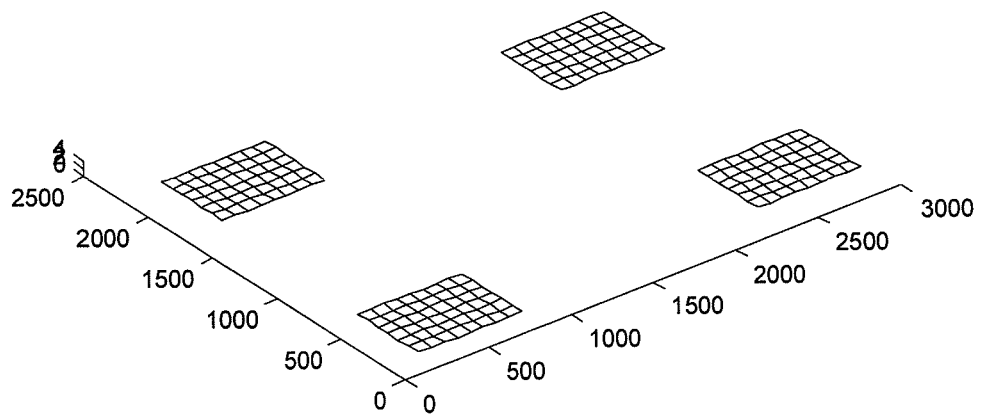
FIGS. 21 and 22 depict a simulated individual field of view measurement on a flat using the sequence of FIGS. 19 and 20.
Figure 22:
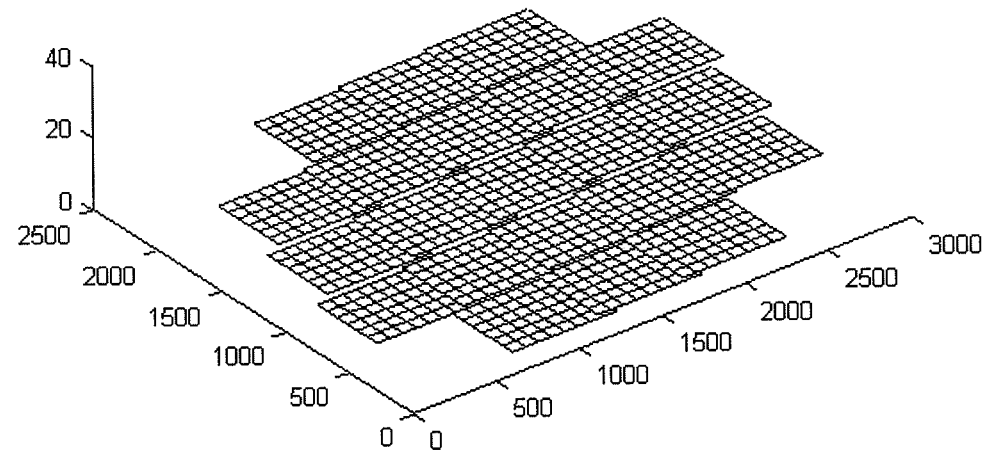
Figure 23:
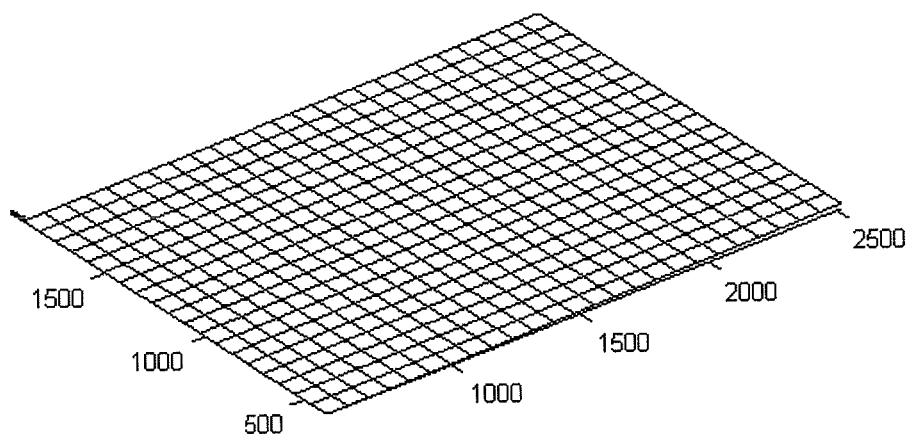
FIG. 23 depicts the simulated results of stitching the dataset of FIGS. 21 and 22 and shows the remaining tilt error.

FIGS. 21 and 22 depict a simulated individual fields of view measurement on a flat using the sequence of FIGS. 19 and 20. FIG. 23 depicts the simulated results of stitching the dataset of FIGS. 21 and 22, these are combined to form a single data set for stitching, but crucially the global orientation and tilt reconstruction is done only on the basis of the data in FIG. 21, instead of the whole.

Comparing FIG. 23 with FIG. 3 shows that the remaining height error is substantially reduced in FIG. 23 by using the sequence of FIGS. 19 and 20. The route of FIG. 19 comprises measurement of edge fields of view 1, 2, 3 or 4 positioned substantially near the edges of the surface.

Figure 24:
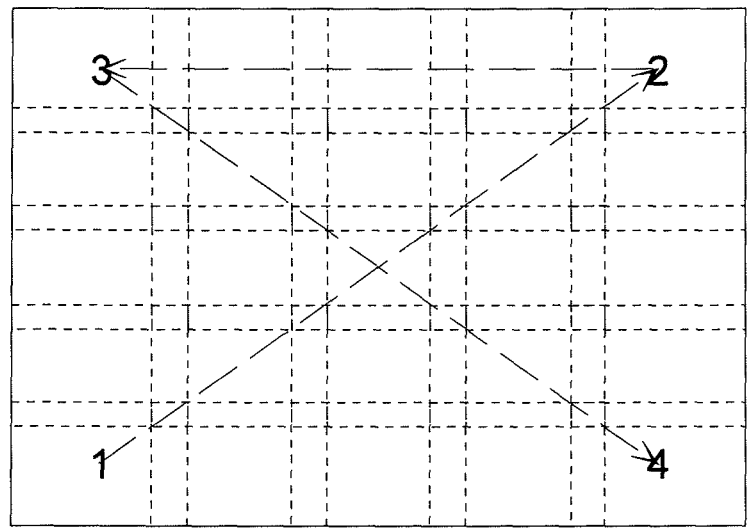
FIGS. 24 to 26 depict a measurement sequence according to a further embodiment.
Figure 25:
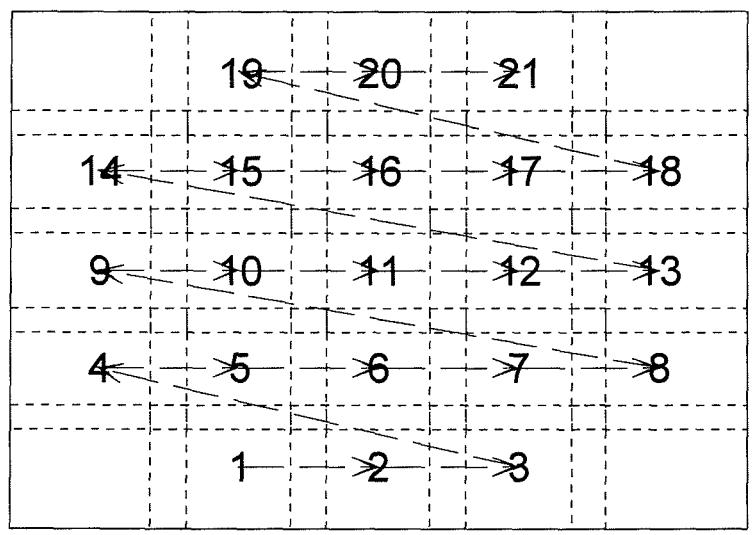
Figure 26:
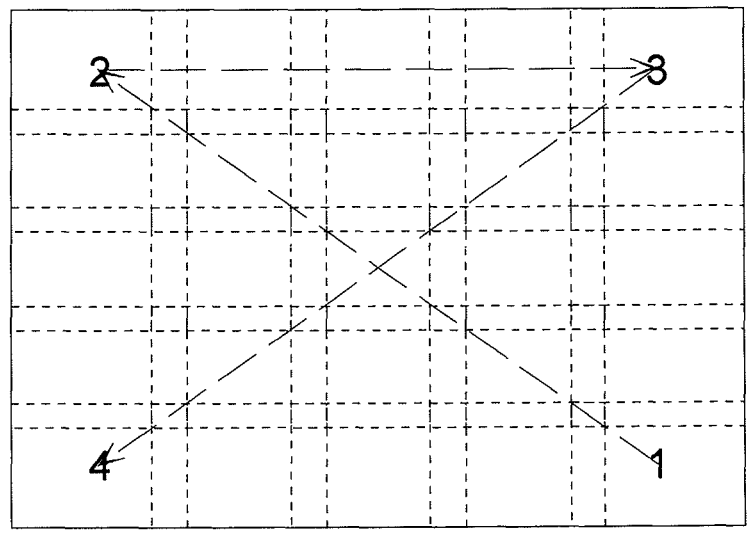

By combining multiple repetitions of the sequence of fields to be used in the reconstruction the tilt error can be even further minimized. FIGS. 24 to 26 depict a measurement sequence according to a further embodiment. The route of FIG. 24 comprises measurement of edge fields of view 1, 2, 3 or 4 positioned substantially near the edges of the surface. Subsequently, the remaining fields of view are measured in FIG. 20 with a time efficient route 1 to 21. The route of FIG. 26 comprises re-measurement of edge fields of view 1, 2, 3 or 4 positioned substantially near the edges of the surface.

Figure 27:
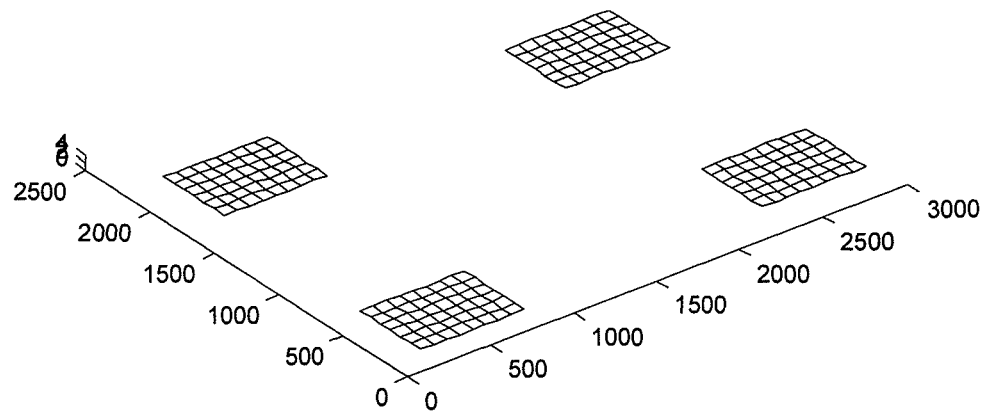
FIGS. 27 to 29 depict a simulated individual field of view measurement on a flat using the sequence of FIGS. 24 to 26; and,
FIG. 30 depicts the simulated results of stitching the dataset of FIGS. 27 to 29 and shows the remaining tilt error.
Figure 28:
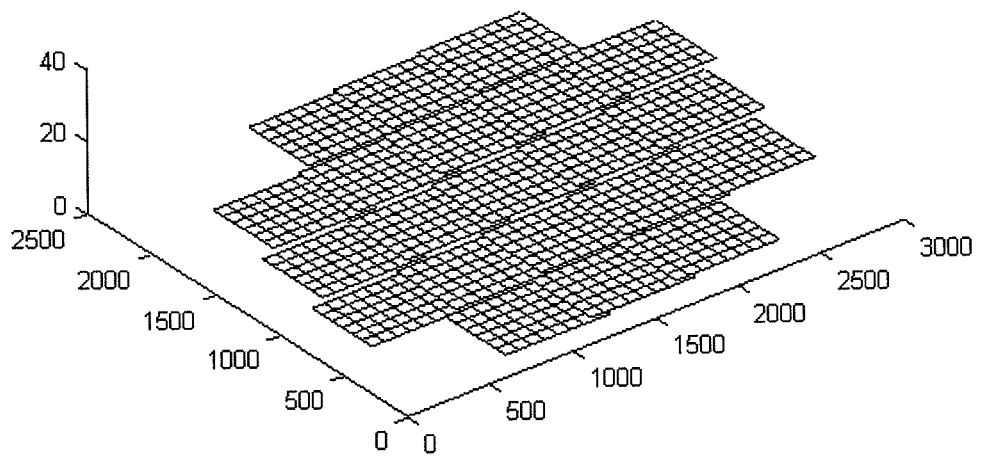
Figure 29:
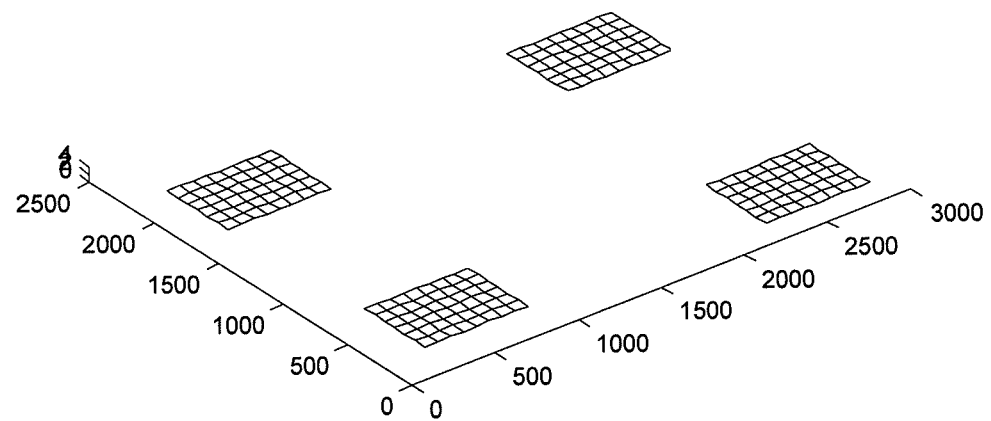
Figure 30:
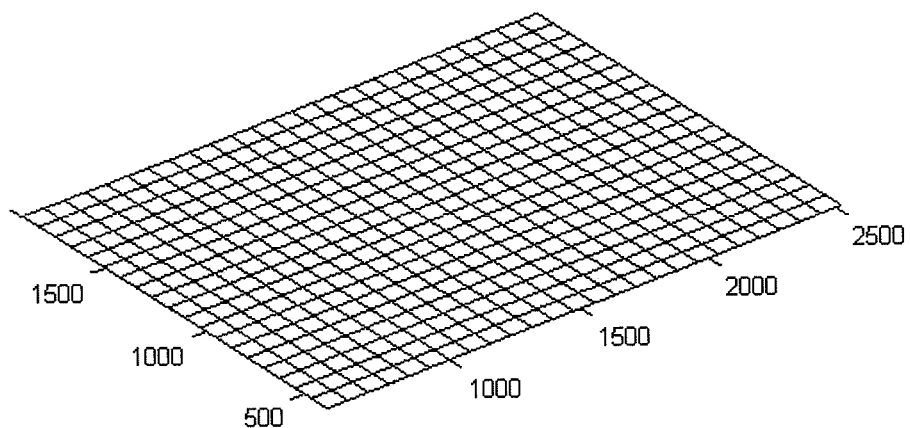

FIGS. 27 to 29 depict a simulated individual fields of view measurement on a flat using the sequence of FIGS. 24 to 26 and FIG. 30 depicts the simulated results of combining the dataset of FIGS. 27 to 29 but only the data in FIGS. 27 and 29 are used for reconstruction of global orientation and tilt and shows the remaining tilt error. Comparing FIG. 30 with FIG. 3 shows that the remaining height error is substantially reduced in FIG. 30 by using the sequence of FIGS. 24 to 26.

Figure 31:
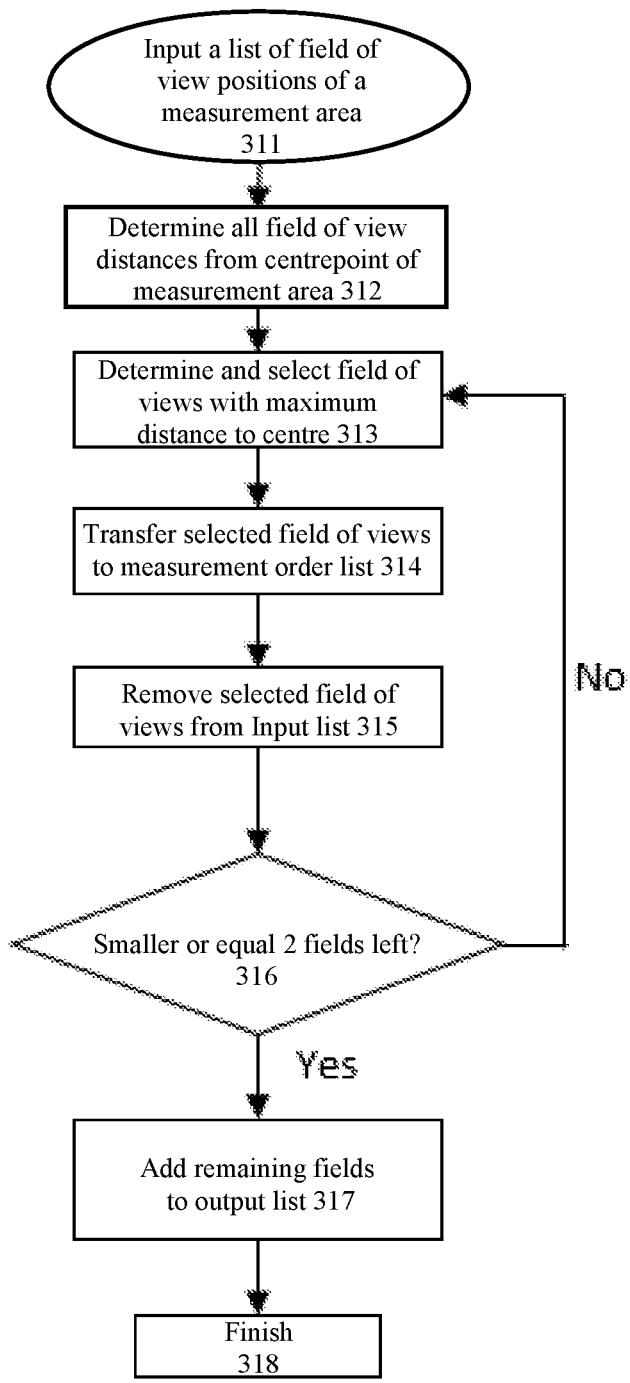
FIG. 31 depicts a flow chart example of an automatic routing algorithm.

A flow chart example of an automatic routing algorithm may be seen in FIG. 31, on the basis that measurement order is determined by the distance to the center of the measurement area. Thus the fields that are furthest away are measured first, and measurement proceeds inwards, finishing (near to) the center point of the measurement area.

FIG. 31 depicts a flow chart example of an automatic routing algorithm. The automatic routing algorithm comprises:

311 Input a list of field of view positions of a measurement area;
312 Determine all field of view distances from centrepoint of measurement area;
313 Determine and select field of views with maximum distance to centre;
314 Transfer selected field of views to measurement order list;
315 Remove selected field of views from Input list;
316 Smaller or equal 2 fields left? If not 313, if yes 317.
317 Add remaining fields to output list; and
318 Finish.

According to an embodiment the automatic routing algorithm method comprises:

input a list of field of view positions of a measurement area;
determine all field of view distances from a centrepoint of measurement area;
determine and select field of views with maximum distance to the centre;
transfer selected field of views to a measurement order list; and,
remove selected field of views from the input list.

Figure 32:
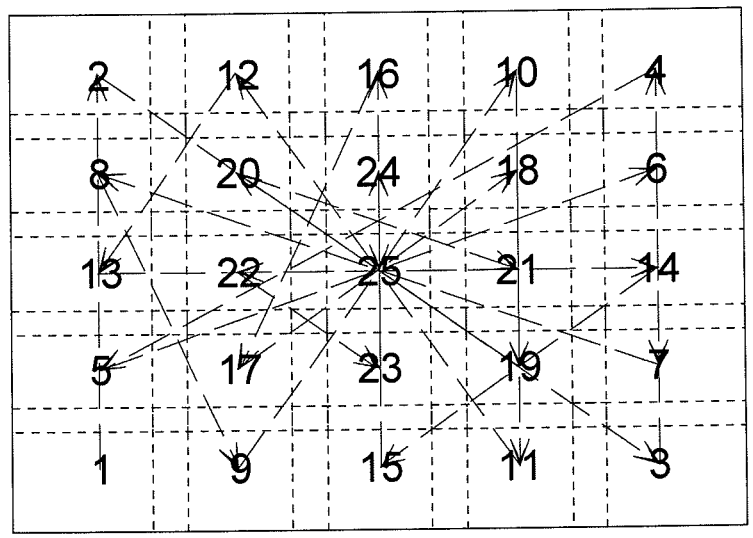
FIG. 32 depicts an example of the use of an algorithm for 5×5 fields of view.
Figure 33:
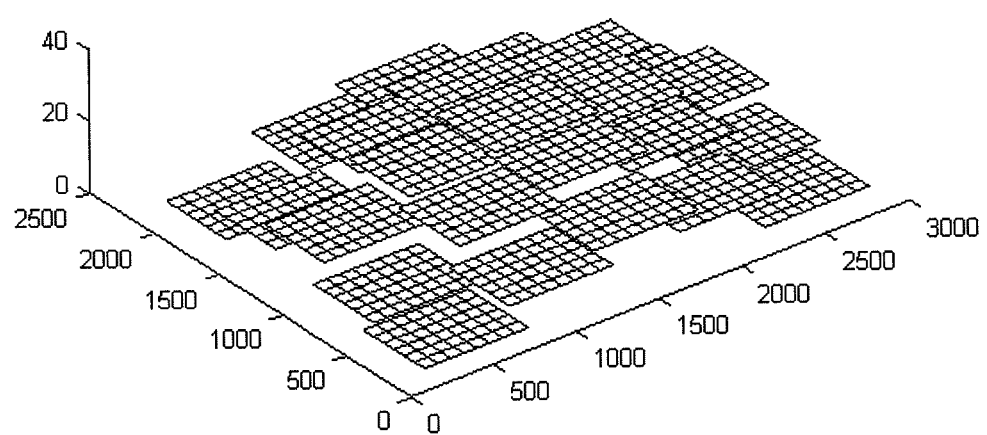
FIG. 33 depicts simulated fields of view measurement sets.
Figure 34:
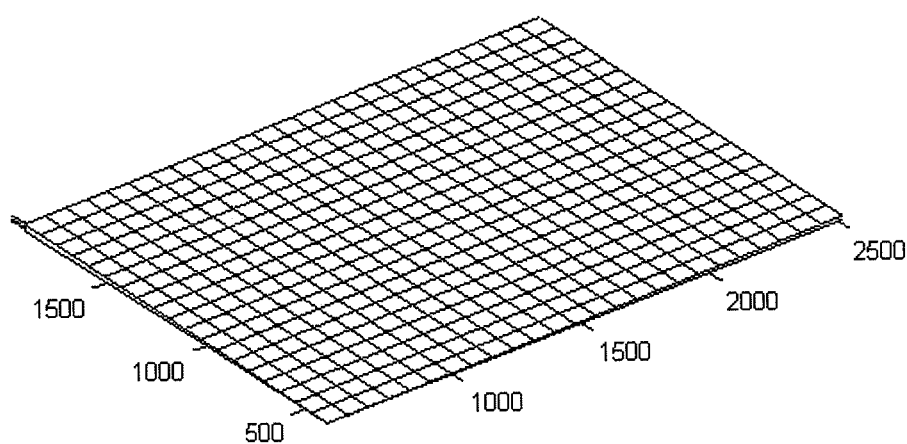
FIG. 34 depicts the simulated stitching results with very little remnant tilt.

An example of the use of this algorithm for 5×5 FOV can result in the routing seen in FIG. 32, which is similar to the spiral routing shown in FIG. 13. The simulated FOV measurement set that results is shown in FIG. 33, with the simulated stitching results shown in FIG. 34. Again, as in the similar stitching results in FIG. 15, FIG. 34 shows very little remnant tilt. Hereby a route may be determined whereby the sensitivity to height drifting of the profilometer may be minimized.

The optical profiler may be a white-light interferometer (WLI), phase-shifting interferometer (PSI), chromatic point sensor (CPS), points-from-focus/shape-from-focus sensor (PFF/SFF), confocal microscope, structured illumination microscope (SIM), or laser interferometer microscope.

The choice of routing option may be manually designated or automatically determined by algorithm through evaluating e.g. field of view configuration (including configuration shape), missing fields of view, field of view count, instrument status, magnitude of drift, or any other applicable factor.

Any other routing options and algorithms that achieve the same goal may be considered.

To ensure that the sample position is within the measurement height range of the sensor moving from one FOV to the next a feed forward method to predict the height of a neighbouring FOV might be used. It must be noted that if a feed-forward technique is to be used to enhance drift compensation, the choice of routing is limited to a spiral, as feed forward requires a field to be directly adjacent to a previous one, for fitting and extrapolation. As such, e.g. random routing will not work.

As alternative to a feed forward method to control the z-position of the sample with respect to the sensor a pre-scan method might be used to provide a coarse (less accurate) map of the sample. Pre-scan methods allow any routing, including random, for the final high precision measurements.

It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Furthermore, the terms and phrases used herein are not intended to be limiting, but rather, to provide an understandable description of the invention.

The terms "a" or "an", as used herein, are defined as one or more than one. The term another, as used herein, is defined as at least a second or more. The terms including and/or having, as used herein, are defined as comprising (i.e., not excluding other elements or steps). Any reference signs in the claims should not be construed as limiting the scope of the claims or the invention. The mere fact that certain measures are recited in mutually different dependent claims does not indicate that a combination of these measures cannot be used to advantage. The scope of the invention is only limited by the following claims.

The invention claimed is:

1. A method for measuring a height map of multiple fields of view on a surface of a substrate with an optical profilometer and combining them to produce a composite height map, the measuring being performed using a measurement route configured to minimize sensitivity to effects caused by a height drift of the profilometer, the method comprises:
receiving, by the profilometer, an input of a list of field of view positions of a measurement area on the surface of the substrate;
determining, by the profilometer, a plurality of field distances from a geometric center point of a configuration of the field of view positions on the measurement area;
selecting, by the profilometer and among the list of field of view positions, field of view positions in order of distance from the geometric center point, wherein a first field of view position selected has a maximum distance from the geometric center point and wherein there is at least one field of view between the first field of view position and a second field of view position;

determining, by the profilometer, the measurement route of the profilometer on the surface of the substrate using the selected field of view positions based on the order of distances from the geometric center point;

moving the profilometer relative to the surface from field to field along the measurement route;

measuring a plurality of height maps of fields on the surface along the measurement route with the profilometer; and combining the plurality of height maps of measured fields to produce a composite height map of the surface.

2. The method according to claim 1, wherein the measurement route comprises directions with a first and second directional component, the second directional component being perpendicular to the first directional component, and moving of the profilometer relative to the surface comprises at least one instance of moving forward and backward in both the first and second directional component during measuring the height maps of the fields of view.

3. The method according to claim 2, wherein moving forward and backward in both the first and second directional component comprises moving forward and backward in the first direction at least two fields of view and moving forward and backward in the second direction at least two fields of view.

4. The method according to claim 2, wherein moving of the profilometer relative to the surface comprises moving forward and backward in both the first and second directional component at least twice during measurement of the height maps of the fields of view.

5. The method according to claim 1, wherein the measurement route is configured to measure the fields in a random order.

6. The method according to claim 1, wherein the measurement route has a spiral or spiral-like shape.

7. The method according to claim 1, wherein the method comprises: measuring and/or re-measuring height maps of multiple fields of view positioned at an area adjacent to the edges of the surface in sequence, wherein the combining the plurality of height maps comprises using the re-measured fields of view to correct the composite height map afterwards for global orientation and tilt.

8. The method according to claim 1, wherein the measurement route comprises crossing a center of the multiple fields on the surface multiple times.

9. The method according to claim 1, wherein the method comprises moving from a measured field to a subsequent field to be measured leaving at least one field positioned therebetween.

10. The method according to claim 1, wherein the method comprises using an algorithm to determine the measurement route.

11. The method according to claim 1, wherein, during the measurement of height maps of fields of view on the surface with the profilometer, a region of overlap or connection between neighboring fields of view is maintained, and wherein the combining the plurality of height maps comprises using the region of overlap or individual field of view height information to determine and correct for height differences in order to produce the composite height map of the surface.

12. The method according to claim 1, wherein the optical profilometer is a white-light interferometer (WLI), phase-shifting interferometer (PSI), chromatic point sensor (CPS), points-from-focus/shape-from-focus sensor (PFF/SFF), confocal microscope, structured illumination microscope (SIM), or laser interferometer microscope.

* * * * *